United States Patent [19]

Smith

[11] 4,444,913

[45] Apr. 24, 1984

[54] MODIFIED POLYISOCYANURATE FOAM AND METHOD OF PREPARATION

[75] Inventor: Stuart B. Smith, Conyers, Ga.

[73] Assignee: Thermocell Development, Ltd., Knoxville, Tenn.

[21] Appl. No.: 442,563

[22] Filed: Nov. 18, 1982

[51] Int. Cl.³ ............................................. C08G 18/14
[52] U.S. Cl. .................................. 521/128; 521/130; 521/131; 521/170; 521/173; 521/176
[58] Field of Search ............... 521/128, 130, 131, 170, 521/173, 176

[56] References Cited

U.S. PATENT DOCUMENTS 4,129,697 12/1978 Schäpel et al. ..................... 521/176
4,221,875 9/1980 Yukuta et al. ..................... 521/128

*Primary Examiner*—Maurice J. Welsh
*Attorney, Agent, or Firm*—Richard P. Crowley

[57] ABSTRACT

An improved, modified polyisocyanurate foam composition having improved compressive strength and good flame and smoke properties is prepared by the reaction of a methylene diisocyanate with a modifying amount of a hydroxyl compound, such as a hydroxyl-containing polyether or a saturated polyester, and with an alicyclic glycol, such as cyclohexane dimethanol, in the presence of a trimerization catalyst, a blowing amount of a blowing agent and a surfactant.

19 Claims, No Drawings

MODIFIED POLYISOCYANURATE FOAM AND METHOD OF PREPARATION

BACKGROUND OF THE INVENTION

Polyisocyanates have been reacted in the presence of a trimerization catalyst to produce polyisocyanurate foams, in an attempt to produce foams which produce high char resistance to fire and low smoke values. The trimerization of polyisocyanates produce foams of superior fire performance over conventional polyurethane foams. The rigid trimerized polyisocyanurate-type foams produced tend to have higher K-factors than urethane foams, but also are quite brittle and friable in nature. The trimerization of methylene diisocyanate produces a foam of low smoke value, but black in color, and which foam is relatively nonburning. The problems with such methylene diisocyanate trimerized foam are the poor compressive strength and high friability.

In order to correct or to mask these undesirable properties, it has been the practice to incorporate small amounts of urethane polyols, such as sucrose amine, glycols or aromatic amines, in the isocyanate reaction mixture, to produce a modified, urethane polyisocyanurate foam. However, the addition of such urethane polyols leads to degradation in the fire and smoke properties of the modified foam.

One standard, widely accepted, two-stage catalyst system used in industry in the preparation of polyol-modified polyisocyanurate foam comprises the combination of dimethyl aminomethyl phenol known as DMP-30 and potassium octoate (see, for example, U.S. Pat. No. 4,101,465). Modified polyisocyanurate foams have been prepared with the standard catalyst and polyethylene glycol in the presence of a blowing agent and a surfactant. In such foam preparation, the higher the ratio of the polyethylene glycol to isocyanate, the more flexible the foam; however, the higher glycol content reduces the fire and flame properties of the foam. The standard catalyst sytstem used permits some urethane linkages to form before trimerization of the isocyanate. The resulting foam, with higher ratios of polyol to isocyanate, then causes black smoke and a reduction in burning properties, so that flame-retardant agents are added to reduce the flame-spread properties. If low ratios of glycol to isocyanate are employed, often flame-retardant agents may be omitted, but the foam has more rigid and friable properties.

Polyurethane foams have been modified in the past by the addition of certain amounts of melamine powder in the reaction mixture, to confer enhanced flame resistance on the resulting polyurethane foam (see U.S. Pat. No. 4,221,875, issued Sept. 9, 1980). In addition, aromatic amine-containing polyols have been used in the preparation of sprayed, rigid, urethane foam compositions, in order to increase the compressive strength of the foam (such as the use of Thanol R-650X polyol, a product of Texaco Chemical Company). The aromatic amine-containing polyol reportedly has catalytic activity which also reduces the catalyst requirements of the urethane foam system and increases the compressive strength of the foam. However, the employment of such product often, as with the use of other polyols, diminishes or degrades the smoke, flame or nonburning properties of the resulting, more rigid urethane foam.

REFERENCE TO PRIOR APPLICATIONS

Copending U.S. patent application Ser. No. 425,396, filed Sept. 28, 1982, now U.S. Pat. No. 4,421,868, which is a continuation-in-part of U.S. patent application Ser. No. 379,118, filed May 17, 1982 (now abandoned), both incorporated herein by reference, are directed to the preparation of a polyester isocyanurate polysetting foam composition having improved flame, smoke and nonburning properties. The foam composition of Ser. No. 379,118 is prepared by the reaction of a saturated polyester resin having hydroxyl groups, and, optionally with a flame-retardant amount of melamine present in a reaction mixture, with a methylene diisocyanate in the presence of a surfactant, a blowing agent and a trimerization catalyst, to provide a closed-cell thermosetting foam.

Copending U.S. patent application Ser. No. 398,369, filed July 14, 1982, now U.S. Pat. No. 4,426,461, incorporated herein by reference, is directed to a modified polyisocyanurate foam having improved flame, smoke and nonburning properties. The foam composition is prepared by the reaction of from about 5 to 40 parts of a methoxy polyethylene glycol or other polyalkoxy glycols and optionally with other glycols or melamine, with 100 parts of a methylene diisocyanate and in the presence of a blowing agent, a surfactant and a trimerization catalyst, to provide a closed-cell, thermosetting modified foam.

SUMMARY OF THE INVENTION

The invention relates to a modified polyisocyanurate foam and to the method of preparing the foam. In particular, the invention concerns an improved, modified, polyisocyanurate foam and the method of preparing the foam, wherein the modified foam contains a polyester resin or a polyether compound which have hydroxyl groups therein, and contains an alicyclic glycol, and which improved modified foam has improved compressive strength, while retaining good or having improved smoke and flame-spread values.

It has been discovered that a modified polyisocyanurate foam composition of improved compressive strength, and yet retaining good smoke, flame and nonburning properties, can be prepared by the employment, in the reaction mixture as a reactant, of a compressive-strength, modifying amount of an alicyclic polyhydroxyl compound, such as by the employment of a high-molecular-weight, alicyclic glycol, such as a cyclohexane polymethanol, and more particularly a 1,4 cyclohexane dimethanol. It has been found that, when a 1,4 cyclohexane dimethanol, one of a class of a high-molecular-weight alicyclic glycols, is added to a polyisocyanurate reaction mixture containing a hydroxyl compound, such as a polyether or polyester, with low hydroxyl numbers; for example, of less than about 300, and particularly less than 250; for example, 50 to 250, the reactivity of the reaction mixture is increased, allowing a reduction in the trimerization catalyst levels employed, and, in addition and importantly, the compressive strength of the resulting thermosetting foam is significantly improved, as is friability, while good and enhanced flame-spread and smoke values are achieved, apparently, because of the strong char strength achieved by the higher compressive strength, through the use of the alicyclic glycol. The alicyclic glycol to be employed typically has solubility in both the polyester and polyether compounds employed to modify the isoocyanurate foam, which also reduces the need for high-shear mixing of the reaction mixture.

The alicyclic glycol compounds are employed in the reaction mixture typically in an amount sufficient to increase the compressive strength of the resulting substantially closed-cell, thermosetting polyisocyanurate foam to a strength of over 25 psi and, for example, over about 30 or 35 psi, or to provide a thermosetting foam having a flame-spread value of 25 or less or, for example, 20 or less, and a smoke value typically of 250 or less, such as 150 or less. The amount of alicyclic glycol compound may be varied; however, it has been found that generally from 2 to 40 parts per 100 parts of the methylene diisocyanate employed in the reaction mixture; for example, from about 5 to 20 parts per 100 parts of MDI, is often sufficient to provide improved compressive strength, with retained or reduced flame-spread and smoke values, while also permitting some reduction in the amount of catalyst, without any diminution in the foam properties.

In the reaction, a methylene diisocyanate (MDI) is employed, such as, for example, a methylene phenyl diisocyanate or a methylene toluene diisocyanate. The average functionality of the isocyanate employed may vary, for example, from about 2.0 to 3.5. However, in reaction mixtures containing a polyalkylene glycol or an alkoxy polyethylene glycol and glycol mixtures, such as methoxy polyethylene glycol, the methylene diisocyanate preferably has an average functionality of about 2.4 or less.

The reaction is carried out in the presence of a trimerization catalyst, preferably a single-stage trimerization catalyst, such as a quaternary-ammonium salt or long-chain metal salts, such as a fatty-acid salt, such as a potassium octoate or similar catalysts or a combination thereof. Typically, the catalyst is employed in an amount ranging from about 0.05 to 5 parts per 100 parts of MDI, such as, for example, 0.5 to 3 parts.

The reaction is further carried out in the presence of a blowing amount of a blowing agent, typically a liquid halocarbon, such as a fluorocarbon, and particularly a chlorofluoro methane or ethane, such as, for example, fluorotrichloro methane, so as to provide the resulting closed-cell thermosetting foam composition, with a low K-factor and high insulating properties, typically less than about 0.15 K-factor. The blowing agent may be employed in various amounts, such as, for example, from about 1 to 20 parts of blowing agent per 100 parts of MDI, and more particularly 5 to 15 parts per 100 parts of MDI.

The reaction is optionally, but usually, carried out in the presence of a surfactant or cell-control agent or an emulsifying-type compound, typically a silicone surfactant, such as a silicone glycol surfactant, or, for example, an ammonia lower alkoxy halide, as an emulsifying surfactant compound, such as ammonium propoxyl chloride. The surfactant or emulsifier is generally used in an amount ranging from about 0.05 to 5 parts per 100 parts of the MDI; for example, 0.1 to 2 parts.

Optionally, the reaction mixture also may contain a flame-retardant amount of a melamine, in order to enhance the flame properties of the resulting polyisocyanurate foam, and particularly to reduce the smoke value of the foam. The melamine is typically employed in an amount of over 100 parts per 100 parts of the hydroxyl compound, such as the glycol composition or unsaturated resin employed; for example, 125 to 200 parts per 100 parts of the glycol composition.

Where a modifying amount of a hydroxyl-containing compound, such as a polyether or polyester compound having a low hydroxyl number of less than about 300, is employed in the reaction mixture, as described in the copending applications, the employment of the glycol increases reactivity and improves compression strength and friability and reduces flame-spread and smoke values. The increase in compressive strength and the improvement in friability enhances the char strength of the foam, which foam has a significant reduction in cracking and shrinking under flame conditions. Typically, a polyether compound, such as a glycol composition, is employed to modify the resulting isocyanurate foam, by employing the glycol is an amount generally from 5 to 40 parts per 100 parts of MDI, such as, for example, from 20 to 35 parts per 100 parts MDI. The glycol composition may comprise a polyalkylene glycol alone, or an alkoxy polyethylene glycol alone, or preferably a combination for the purpose of cost reduction of both glycols, such as, for example, the combination of a liquid polyethylene glycol with a liquid methoxy polyethylene glycol. Typically, the glycol compositions employed have a molecular weight ranging from about 100 to 600.

Another hydroxy-containing compound which may be employed in modifying the polyisocyanurate foam is the employment of a saturated polyester resin, such as those resins prepared by the reaction of a saturated carboxylic aliphatic or aromatic acid, such as adipic acid or phthalic acid, with a dihydroxy alcohol, such as, for example, the reaction of ethylene glycol and adipic acid. The polyester resins typically contan hydroxyl groups and have hydroxyl numbers generally ranging from about 30 to 250, and more typically from 100 to 225. The saturated polyester resin may be employed alone or in combination with the glycol composition. The saturated hydroxyl-containing polyester resin may be employed in an amount sufficient to modify the isocyanurate foam, and typically from about 5 to 50 parts per 100 parts of MDI, and more typically 10 to 40 parts.

The foam produced generally has a low density, such as a density of less than 3 pounds per cubic foot, and typically about 2 pounds or less. One method of preparation of the foam composition of the invention comprises the mixing of the components directly at room temperature; for example, 50° F. to 80° F., and, thereafter, the addition of the surfactant, blowing agent and trimerization catalyst to the reaction mixture, and, thereafter, the addition of the methylene diisocyanate, to provide a rapid rise exotherm and to provide a resulting thermoset foam product. Typically, the foam product will be a substantially closed-cell foam product having generally over 85%, and more typically over 90%, closed cells.

The invention will be described in connection with certain embodiments; however, it is recognized that various changes and modifications may be made by those persons skilled in the art, all without departing from the spirit and scope of the invention.

DESCRIPTION OF THE EMBODIMENTS

Saturated polyester resin, modified, polyisocyanurate foams were prepared in accordance with the formulations shown in Table I, and the resulting foams were then tested, with the properties of the foams shown in the data of Table II.

TABLE I

| INGREDIENTS | Formulation PARTS BY WEIGHT | | | |
|---|---|---|---|---|
| | 1 | 2 | 3 | 4 |
| 1. Saturated polyester resin prepared by the reaction of adipic acid and diethylene glycol OH #250 (Reichhold Chemicals, Inc. resin 292) | 20 | 10 | 10 | 10 |
| 2. Emulsifier surfactant - ammonia propoxyl chloride (Witco Chemicals, Inc. (CC 36)) | 1 | 1 | 1 | 1 |
| 3. Catalyst - potassium octoate | 2.0 | 2.0 | 1.5 | 2.0 |
| 4. Blowing agent - fluorocarbon Freon-11 (du Pont Co.) | 25 | 25 | 25 | 25 |
| 5. Cyclohexane dimethanol (CHDM) (Eastman Chemical Products Inc.) | — | 10 | 10 | — |
| 6. Methylene diisocyanate (MDI) - Rubinate M functionality 2.7–3.0 (Rubicon Chemical Co.) | 100 | 100 | 100 | 100 |
| 7. Aromatic amine-containing polyol - Thanol R-650X (Texaco Chemical Company) | — | — | — | 10 |

TABLE II

| RESULTS | Formulation | | | |
|---|---|---|---|---|
| | 1 | 2 | 3 | 4 |
| 1. Cream time (seconds) | 6 | 6 | 6 | 20 |
| 2. Tack-free temperature (seconds) | 35 | 35 | 35 | 60 |
| 3. Cure time (seconds) | 120 | 35 | 35 | 120 |
| 4. Density in pcf | 2.0 | 1.85 | 1.85 | |
| 5. Compressive strength psi | 16 | 28 | 28 | 25 |
| 6. Closed-cell (vol %) | 80 | 92 | 92 | |
| 7. K-factor | 0.14 | 0.12 | 0.12 | 0.135 |
| 8. Flame spread - ASTM E-84 | 35 | 25 | 25 | 50 |
| 9. Smoke value - ASTM E-84 | 450 | 225 | 225 | 500 |
| 10. Friability | slight | no | no | low |

Formulation 1 shows an isocyanate saturated polyester resin modified foam prepared, for example, as set forth in U.S. patent application Ser. No. 425,396, filed Sept. 28, 1982. Formulations 2 and 3 are directed to the foams of the present invention, wherein a modifying amount of a cyclohexane dimethanol has been employed, with Formulation 3 having substantially the same properties as Formulation 2, but employing 25% less catalyst. The employment of the alicyclic glycol provided for an increase in compressive strength to 28 psi, a decrease in flame-spread values to 25 and a decrease in smoke values to 225, and an improvement in friability.

Formulation 4 is directed to the employment of a standard aromatic amine-containing polyol generally employed in the preparation of rigid urethane foams. Formulation 4 shows an increase in smoke and flame-spread values, with an increase in compressive strength. The employment of the alicyclic glycol, as shown in Formulations 2 and 3, provided for significant improvements in compressive strength, flame spread, smoke value, catalyst reduction, friability and K-factor, in comparison to the saturated resin modified foam alone or where an aromatic polyol is employed.

Glycol modified polyisocyanurate foams were prepared in accordance with the formulations as set forth in Table III, and the performance of the resulting thermosetting foams shown by the data of Table IV.

TABLE III

| INGREDIENTS | Formulation PARTS BY WEIGHT | | | |
|---|---|---|---|---|
| | 5 | 6 | 7 | 8 |
| 1. Polyethylene glycol (PEG) | | | | |
| MW 400 | 20 | 12.5 | — | — |
| MW 600 | — | — | 12.5 | — |
| 2. Methoxy polyethylene glycol (MPEG) MW 350 | — | — | — | 12.5 |
| 3. Emulsifier surfactant - ammonia propoxychloride (Witco Chemicals, Inc. CC 36) | 1.0 | 1.0 | 1.0 | 1.0 |
| 4. Catalyst - potassium octoate | 2.0 | 2.0 | 2.0 | 2.0 |
| 5. Blowing agent - fluorocarbon (Freon-11 (du Pont Co.)) | 25 | 25 | 25 | 25 |
| 6. Cyclohexane dimethanol (CHDM) (Eastman Chemical Products, Inc.) | — | 7.5 | — | 7.5 |
| 7. Aromatic amine-containing polyol (Thanol R-650X (Texaco Chemical Company) | — | — | 7.5 | — |
| 8. Methylene diioscyanate (MDI) (Rubinate M) (Rubicon Chemical, Inc.) | 100 | 100 | 100 | 100 |

TABLE IV

| RESULTS | Formulation | | | |
|---|---|---|---|---|
| | 5 | 6 | 7 | 8 |
| 1. Cream time (seconds) | 6 | 6 | 20 | 10 |
| 2. Tack-free temperature (seconds) | 25 | 25 | 45 | 30 |
| 3. Cure time (seconds) | 50 | 35 | 112 | 40 |
| 4. Density in pcf | 2.0 | 2.0 | | 2.0 |
| 5. Compressive strength psi | 15 | 35 | 20 | 37.0 |
| 6. Closed-cell (vol %) | | | | |
| 7. K-factor | 0.125 | 0.115 | 0.125 | 0.113 |
| 8. Flame spread - ASTM E-84 | 30 | 20 | 35 | 10 |
| 9. Smoke value - ASTM E-84 | 200 | 150 | 350 | 50 |
| 10 Friability | slight | no | low | no |

The isocyanurate foams of Tables III and IV were modified by the use of polyethylene glycol and methoxy polyethylene glycol. Formulation 5 shows a prior-art polyethylene glycol-modified isocyanurate foam. Formulation 6 shows a glycol-modulated foam in which an alicyclic glycol has been employed. Formulation 7 shows another polyethylene-modified polyisocyanurate foam in which an aromatic amine-containing polyol has been employed, while Formulation 8 shows a methoxy polyethylene glycol-modified foam in which an alicyclic glycol has been employed. Where the cyclohexane dimethylol was employed in Formulations 6 and 8, there was a substantial increase in compressive strength to 35 psi and over, a reduction in flame-spread and smoke value properties, an improvement in friability and a reduction in K-factor, while with Formulation 7, employing the aromatic amine-containing polyol, there was only a slight improvement in compressive strength, but a substantial increase in flame-spread and smoke values over the polyethylene glycol-modulated foam of Formulation 5. The methoxy polyethylene glycol-modified foam of Formulation 6, with the use of the alicyclic glycol, showed substantial reductions in flame-spread and smoke values, an improvement in friability, as well as enhanced compressive strength. Thus, Formulations 6 and 8 clearly demonstrate the significant advantages of employing an alicyclic glycol as a modifying agent to glycol-modified foams. A diethylene glycol; that is, a noncyclic glycol, was substituted for the cyclohexane dimethylol in Formulation 7, and, although strength was improved and friability was reduced, the fire performance was unacceptable, due to excessive shrinkage annd poor char formation of the resulting foam.

Thus, the employment of modifying amounts of alicyclic glycols, such as cyclohexane dimethanol, added to polyester and polyether hydroxyl-containing modified polyisocyanurate foams, provides for improvement in compressive strength, K-factor and fire-performance factors.

What is claimed is:

1. In a polyisocyanurate rigid foam prepared by the reaction of a methylene diisocyanate with a modifying amount of a hydroxy-containing compound, having a hydroxyl number of about 300 or less, the hydroxyl-containing compound selected from the group consisting of a saturated polyester resin prepared by the reaction of a dicarboxylic acid and an aliphatic dihydroxy alcohol, and a alkoxy polyalkylene glycol, the reaction carried out in the presence of a catalytic amount of a trimerization catalyst, a blowing amount of a blowing agent and a surfactant, the improvement which comprises:

adding to the reaction mixture a compressive-strength modifying amount of an alicyclic glycol compound.

2. The foam of claim 1 wherein the alicyclic glycol is present in an amount ranging from about 2 to 40 parts per 100 parts of the methylene diisocyanate.

3. The foam of claim 1 wherein the alicyclic glycol comprises a cyclohexane polymethanol.

4. The foam of claim 1 wherein the alicyclic glycol comprises a 1,4 cyclohexane dimethanol.

5. The foam of claim 1 wherein the foam has a compressive strength of greater than 25 psi and a flame-spread value of 25 or less and a smoke value of 250 or less.

6. The foam of claim 1 wherein the methylene diisocyanate has a functionality of about 2.4 or less.

7. The foam of claim 1 wherein the hydroxyl compound includes a polyalkylene glycol in an amount ranging from about 5 to 40 parts per 100 parts of the methylene diisocyanate.

8. The foam of claim 1 wherein the hydroxyl compound comprises an alkoxy polyalkylene glycol in an amount of from about 5 to 40 parts per 100 parts of methylene diisocyanate.

9. The foam of claim 8 wherein the alkoxy polyalkylene glycol comprises a methoxy polyethylene glycol.

10. The foam of claim 1 wherein the hydroxyl compound comprises a saturated polyester resin prepared by the reaction of a saturated dicarboxylic acid with an aliphatic dihydroxy alcohol, and having a hydroxyl number of about 250 or less.

11. The foam of claim 10 wherein the saturated polyester resin is the reaction product of adipic acid and a diethylene glycol.

12. The foam of claim 1, which foam includes a flame-retardant amount of melamine.

13. The foam of claim 1 wherein the hydroxyl compound comprises an admixture of polyethylene glycol and methoxy polyethylene glycol.

14. The foam of claim 13 which includes a flame-retardant amount of melamine in excess of the amount of the hydroxyl compound employed.

15. The foam of claim 1 wherein the trimerization catalyst is a single-stage trimerization catalyst comprising a quaternary-ammonium salt or a metal fatty-acid salt.

16. The foam of claim 1 wherein the blowing agent comprises a fluorocarbon blowing agent.

17. In a polyisocyanurate, rigid, substantially closed-cell foam prepared by the reaction of a methylene diisocyanate with a modifying amount of a saturated polyester resin prepared by the reaction of a saturated dicarboxylic acid with an aliphatic dihydroxy alcohol, and having a hydroxyl number of less than about 300, the reaction carried out in the presence of a catalytic amount of a trimerization catalyst, a blowing amount of a fluorocarbon blowing agent and a cell-control amount of a surfactant, the improvement which comprises:

adding to the reaction mixture from about 2 to 40 parts per 100 parts of the methylene diisocyanate of a cyclohexane dimethanol.

18. In a polyisocyanurate, rigid, substantially closed-cell foam prepared by the reaction of a methylene diisocyanate with a modifying amount of a hydroxyl compound comprising a glycol composition which comprises a methoxy polyethylene glycol or admixtures thereof with polyethylene glycol, and having a hydroxyl number of less than about 300, the reaction carried out in the presence of a catalytic amount of a trimerization catalyst, a blowing amount of a fluorocarbon blowing agent and a cell-control amount of a surfactant, the improvement which comprises:

adding to the reaction mixture from about 2 to 40 parts per 100 parts of the methylene diisocyanate of a cyclohexane dimethanol.

19. The foam of claim 18 wherein the methoxy polyethylene glycol comprises from about 5 to 40 parts of methoxy polyethylene glycol per 100 parts of the methylene diisocyanate.

* * * * *